United States Patent
Kim et al.

(10) Patent No.: US 8,545,087 B2
(45) Date of Patent: Oct. 1, 2013

(54) LIGHT-EMITTING ASSEMBLY AND DISPLAY APPARATUS HAVING THE SAME

(75) Inventors: Dong-Kwon Kim, Asan-si (KR);
Ju-Hwa Ha, Asan-si (KR);
Kwang-Hoon Lee, Anyang-si (KR);
Jeong-Min Seo, Yongin-si (KR);
Won-Seok Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 167 days.

(21) Appl. No.: 13/242,560

(22) Filed: Sep. 23, 2011

(65) Prior Publication Data

US 2012/0230050 A1    Sep. 13, 2012

(30) Foreign Application Priority Data

Mar. 9, 2011    (KR) .............................. 2011-0020904

(51) Int. Cl.
*F21V 7/04*    (2006.01)

(52) U.S. Cl.
USPC ............................ 362/628; 362/602; 362/621

(58) Field of Classification Search
USPC ................. 362/628, 602, 606, 608, 615, 617, 362/619, 621
See application file for complete search history.

(56) References Cited

U.S. PATENT DOCUMENTS

| | | | |
|---|---|---|---|
| 7,101,063 B2 * | 9/2006 | Long et al. ................ | 362/328 |
| 2007/0064417 A1 | 3/2007 | Hatanaka et al. | |
| 2007/0201234 A1 | 8/2007 | Ottermann | |
| 2008/0030647 A1 | 2/2008 | Watanabe et al. | |
| 2008/0068819 A1 * | 3/2008 | Ming-Kuen et al. ........ | 362/11 |
| 2008/0297696 A1 * | 12/2008 | Banerjee ................... | 349/65 |
| 2013/0044507 A1 * | 2/2013 | Baek et al. ................ | 362/602 |
| 2013/0088889 A1 * | 4/2013 | Kim et al. ................. | 362/602 |

OTHER PUBLICATIONS

European Search Report dated Jun. 13, 2012, Application No. 11189848.2-2217.

* cited by examiner

*Primary Examiner* — Mary Ellen Bowman
(74) *Attorney, Agent, or Firm* — Cantor Colburn LLP

(57) ABSTRACT

In a light-emitting assembly and a display apparatus having the light-emitting assembly, the light-emitting assembly includes a light guide plate, a first light-emitting module and a second light-emitting module. The light guide plate includes a first surface, a second surface facing the first surface and including a light incident portion and a light exiting portion, and a third surface connecting the first surface with the second surface and inclined toward the first surface. The first light-emitting module is on the light incident portion of the second surface and emits a first light to the light incident portion. The second light-emitting module faces the third surface and emits a second light having a wavelength different from the first light, to the third surface.

20 Claims, 9 Drawing Sheets

LIGHT-EMITTING ASSEMBLY AND DISPLAY APPARATUS HAVING THE SAME

This application claims priority to Korean Patent Application No. 2011-0020904, filed on Mar. 9, 2011, and all the benefits accruing therefrom under 35 U.S.C. §119, the contents of which are herein incorporated by reference in its entirety.

BACKGROUND OF THE INVENTION

1. Field of the Invention

Exemplary embodiments of the invention relate to a light-emitting assembly and a display apparatus having the light-emitting assembly. More particularly, exemplary embodiments of the invention relate to a light-emitting assembly used for a display apparatus and a display apparatus having the light-emitting assembly.

2. Description of the Related Art

Generally, a display apparatus includes a display panel displaying an image and a light-emitting assembly providing light to the display panel. The display panel includes a first substrate on which a switching element for driving a pixel and a pixel electrode are formed, a second substrate facing the first substrate, and a liquid crystal layer interposed between the first and second substrates. A voltage is applied to the liquid crystal layer to control a transmittance of the light provided from the light-emitting assembly, so that the display panel may display the image.

In addition, the display panel functions as a touch panel operated by an outer pressure as well. Hereinafter, a touch screen panel is referred to as a panel performing both a display function and a touch function. In the touch screen panel, the second substrate of the touch screen panel includes a photo sensor and a switching element controlling the photo sensor. When the outer pressure is applied, the photo sensor absorbs an incident light having a specific wavelength to generate a photo current. A central process unit connected to the touch screen panel calculates a touch position using a difference between the photo current and a dark current generated by the photo sensor before the light is provided to the photo sensor. The light absorbed into the photo sensor has a wavelength different from that of a visible light used for displaying the image in the touch screen panel. For example, the light absorbed into the photo sensor may an infrared light. Thus, the light-emitting assembly includes both a first light source emitting the infrared light and a second light source emitting the visible light.

The light-emitting assembly uses a direct-illumination type in order to uniformly receive the light from each of the first and second light sources and to provide the light to the touch screen panel, and in order to improve a luminance. For example, a plurality of the first light sources is disposed on a surface facing the touch screen panel in a grid pattern and each of the second light sources is disposed in a region divided by the four first light sources, so that the first and second light sources are uniformly disposed on the surface facing the touch screen panel.

However, when the light-emitting assembly has the direct-illumination type, the light-emitting assembly needs to include light sources more than the light-emitting assembly having an edge-illumination type so that a manufacturing cost and a power consumption may be increased. In addition, the light-emitting assembly of the direct-illumination type requires a receiving space for the first and second light sources under the touch screen panel so that decreasing a total thickness of the display apparatus is limited. However, when the light-emitting assembly has the edge-illumination type, the above problems may be solved. However, the receiving space for the first and second light sources may be limited, in the light-emitting assembly of the edge-illumination type. In addition, the light may be hard to be uniformly provided to the touch display panel.

BRIEF SUMMARY OF THE INVENTION

Exemplary embodiments of the invention provide a light-emitting assembly of an edge-illumination type capable of uniformly providing light emitted from light sources different from each other to a touch screen panel.

Exemplary embodiments of the invention also provide a display apparatus including the light-emitting assembly.

According to an exemplary embodiment of the invention, the light-emitting assembly includes a light guide plate, a first light-emitting module and a second light-emitting module. The light guide plate includes a first surface, a second surface which faces the first surface and includes a light incident portion and a light exiting portion, and a third surface which connects the first surface with the second surface and is inclined toward the first surface. The first light-emitting module is on the light incident portion of the second surface and emits a first light to the light incident portion. The second light-emitting module faces the third surface and emits a second light having a wavelength different from the first light to the third surface.

In an embodiment, an area of the first surface may be smaller than that of the second surface.

In an embodiment, the light incident portion may include a projective plane of the third surface orthogonal to the second surface, and the first light and the second light incident into the light guide plate may exit through the light exiting portion of the second surface.

In an embodiment, an acute angle ($\theta_s$) formed by the first surface and the third surface may be substantially the same as a total reflection angle of the first light which passes through the light incident portion of the first surface and is incident to the third surface. The acute angle ($\theta_s$) may be between about 41° and about 45°.

In an embodiment, the first light which passes through the light incident portion may be reflected by the third surface, guided to the light guide plate and exit through the light exiting portion.

In an embodiment, when "$\theta_B$" refers to the Brewster's angle of the first light incident into the light incident portion, an incident angle ($\theta_a$) of the first light incident into the light incident portion is $0° \leq \theta_a \leq \theta_B$.

In an embodiment, the second light may be incident to the light guide plate in a direction perpendicular to the third surface. The second light which passes through the third surface may be reflected by the second surface, guided to the light guide plate and exit through the light exiting portion of the second surface.

In an embodiment, the first light-emitting module may include a plurality of first light-emitting diodes which generate the first light, and a first printed circuit board ("PCB") having a first PCB surface including the first light-emitting diodes thereon in a line, the first PCB surface facing the light incident portion. The second light-emitting module may include a plurality of second light-emitting diodes which generate the second light, and a second PCB having a second PCB surface including the second light-emitting diodes thereon in substantially the same direction as the first light-emitting diodes, the second PCB surface facing the third surface.

In an embodiment, the first light may be an infrared light and the second light may be a visible light.

According to another exemplary embodiment of the invention, the display apparatus includes a light-emitting assembly and a touch screen panel. The light-emitting assembly includes a light guide plate, a first light-emitting module and a second light-emitting module. The light guide plate includes a first surface, a second surface which faces the first surface and includes a light incident portion and a light exiting portion, and a third surface which connects the first surface with the second surface and is inclined toward the first surface. The first light-emitting module is on the light incident portion of the second surface and emits a first light to the light incident portion. The second light-emitting module faces the third surface and emits a second light having a wavelength different from the first light to the third surface. The touch screen panel receives the first light and the second light, and displays an image and senses an outer touch.

In an embodiment, the display apparatus may further include a receiving container and a mold frame. The receiving container may receive the light-emitting assembly, the mold frame and the touch screen panel. The mold frame supports the touch screen panel, and includes a fixing portion which fixes the first light-emitting module on the second surface.

In an embodiment, the receiving container may include a supporting portion which faces the third surface and supports the second light-emitting module.

In an embodiment, the touch screen panel may include a touch screen substrate and a display substrate. The touch screen substrate may include a first sensing part which senses the first light, and a second sensing part which senses the second light. The display substrate may face the touch screen substrate and include a pixel electrode, and a switching element in electrical connection to the pixel electrode.

According to the invention, in a light guide plate including a first surface, a second surface, and a third surface connecting the first surface with the second surface and inclined with respect to the first surface, two different types of light-emitting modules are in a region adjacent to the third surface so that a thickness of an edge type display apparatus may be relatively decreased compared to a direct-illumination type display apparatus. Thus, a power consumption of a light-emitting assembly may be decreased, and the number of light-emitting diodes included in the light-emitting modules may be decreased to reduce a manufacturing cost.

In addition, a first light-emitting module of two light-emitting modules faces the second surface, and a second light-emitting module faces the third surface, so that the first and second light-emitting modules may uniformly provide light to the light guide plate.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

Hereinafter, the invention will be explained in detail with reference to the accompanying drawings.

Figure 1:
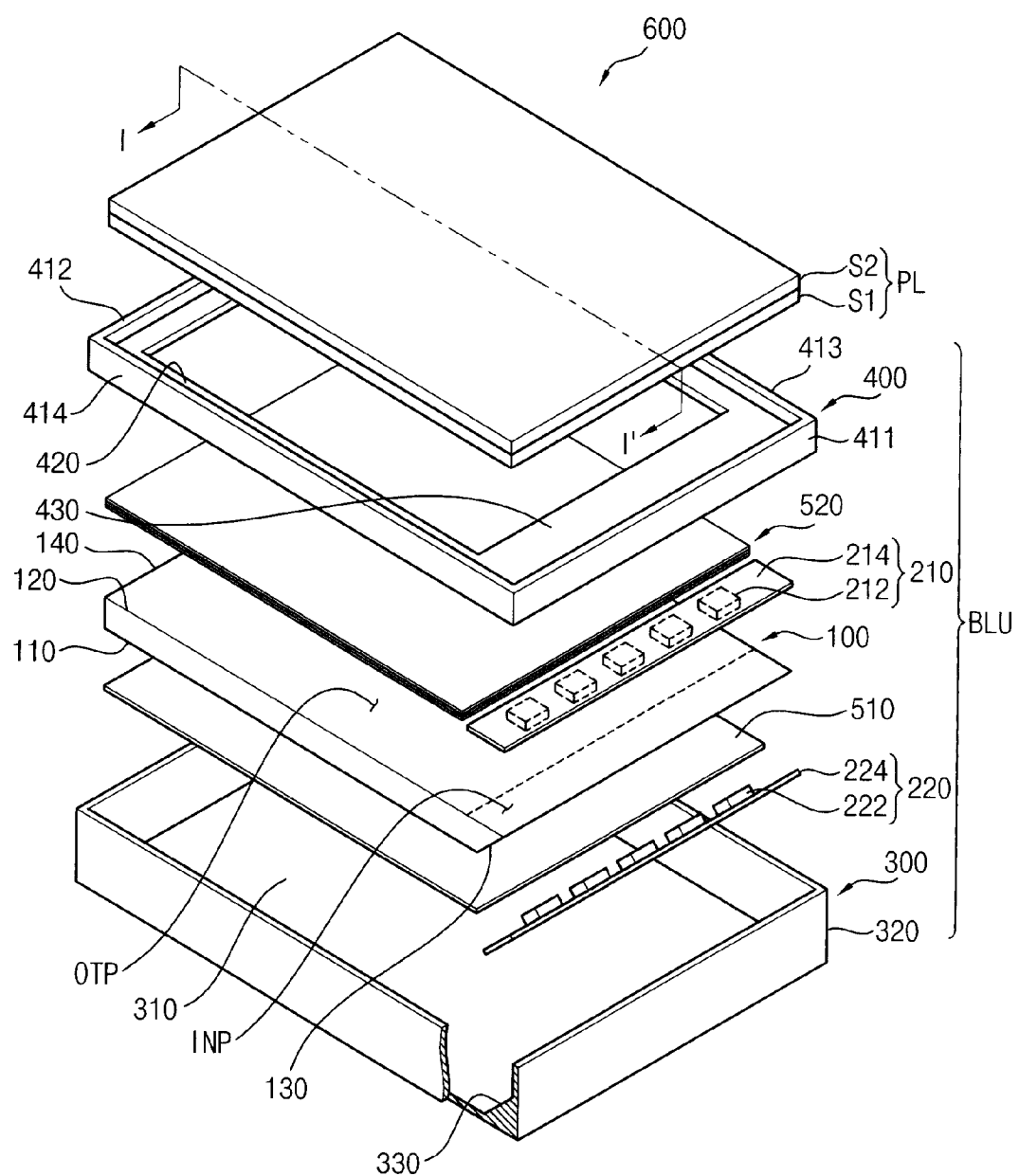
FIG. 1 is an exploded perspective view illustrating an exemplary embodiment of a display apparatus according to the invention.
Figure 2:
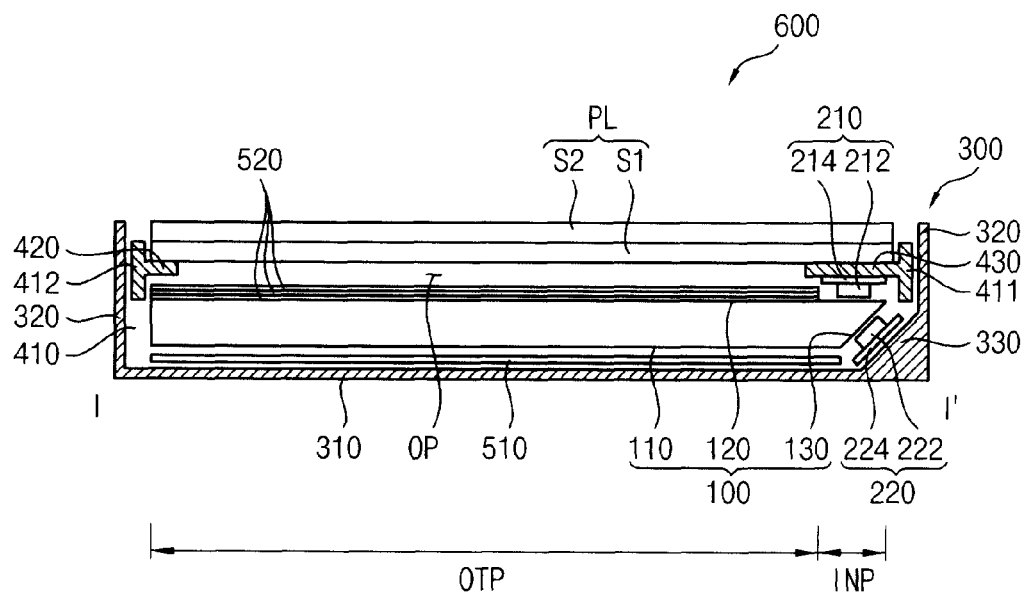
FIG. 2 is a cross-sectional view taken along line I-I' in FIG. 1.
Figure 3:
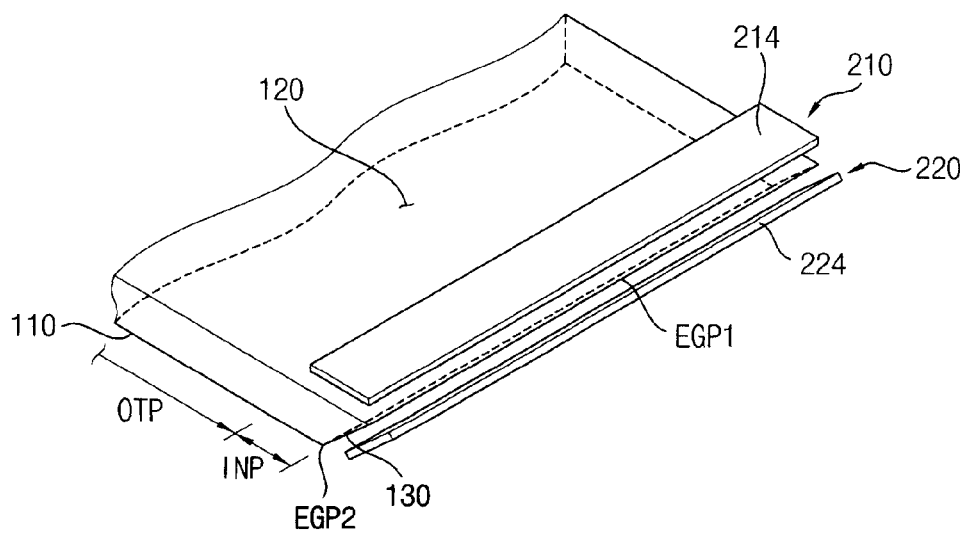
FIG. 3 is a partial perspective view illustrating an exemplary embodiment of a position relation between a light guide plate, a first light-emitting module and a second light-emitting module in FIG. 1.

FIG. 1 is an exploded perspective view illustrating an exemplary embodiment of a display apparatus according to the invention, and FIG. 2 is a cross-sectional view taken along line I-I' in FIG. 1. FIG. 3 is a partial perspective view illustrating an exemplary embodiment of a position relation between a light guide plate, a first light-emitting module and a second light-emitting module in FIG. 1.

Referring to FIGS. 1, 2 and 3, a display apparatus 600 includes a light-emitting assembly BLU and a touch screen panel PL. The touch screen panel PL is over the light-emitting assembly BLU and receives a light from the light-emitting assembly BLU.

The light-emitting assembly BLU includes a light guide plate 100, a first light-emitting module 210, a second light-emitting module 220, a receiving container 300, a mold frame 400, a reflective sheet 510 and optical sheets 520. An inner space 410 of the receiving container 300 receives the light guide plate 100, the first and second light-emitting modules 210 and 220, the mold frame 400, the reflective sheet 510 and the optical sheets 520. The inner space 410 is formed by a bottom portion 310 of the receiving container 300 and sidewalls 320 connected to the bottom portion 310.

The light guide plate 100 includes a first surface 110 facing the bottom portion 310, a second surface 120 facing the first surface 110, and a third surface 130 connecting the first surface 110 with the second surface 120 and inclined with respect to the first surface 110. The sidewalls 320 face side surfaces of the light guide plate 100 connecting the first surface 110 with the second surface 120 except for the third surface 130. The side surfaces may be substantially perpendicular to the first and second surfaces 110 and 120, respectively. In one exemplary embodiment, for example, a fourth surface 140 facing the third surface 130 as an inclined surface may be substantially perpendicular to each of the first and second surfaces 110 and 120.

The first surface 110 reflects a first light emitted from the first light-emitting module 210 and a second light emitted from the second light-emitting module 220. In one exemplary embodiment, for example, a plurality of dots (not shown) may be on the first surface 110, and a reflection ratio of the first light and second light in the first surface 110 may be improved by the dots. The reflective sheet 510 is between the first surface 110 and the bottom portion 310. The reflective sheet 510 reflects a light which is not reflected on the first surface 110 and passes through the first surface 110, so that a light efficiency may be improved.

The second surface 120 faces the first light-emitting module 210. The second surface 120 is divided into a light incident portion INP facing the first light-emitting module 210 and a light exiting portion OTP. The light incident portion INP is a portion of the second surface 120 adjacent to a first edge EGP1 of the light guide plate 100 connected to the second and third surfaces 120 and 130. In one exemplary embodiment, for example, the light incident portion INP may include a projective plane of the third surface 130 orthogonally projected on the second surface 120. In one exemplary embodiment, for example, the light incident portion INP may be defined as a region between a portion of the second surface 120 corresponding to a second edge EGP2 of the light guide plate 100, and the first edge EGP1. The second edge EGP2 is defined as a portion connected to the first surface 110 and the third surface 130. The first light-emitting module 210 is on the light incident portion INP so that the first light is provided to the light guide plate 100 through the light incident portion INP. A light path of the first light incident into the light guide plate 100 through the light incident portion INP will be illustrated later, referring to FIG. 4.

The light exiting portion OTP is a remaining region of the second surface 120 excluding the light incident portion INP of the second surface 120. The first light incident into the light guide plate 100 through the light incident portion INP is reflected on the first surface 110 and exits to an outside of the light guide plate 100 through the light exiting portion OTP. In addition, the second light incident into the light guide plate 100 is reflected on the first surface 110 and exits to the outside of the light guide plate 100 though the light exiting portion OTP. The optical sheets 520 are on the second surface 120. In one exemplary embodiment, for example, the optical sheets 520 may be on (e.g., overlapping) only the light exiting portion OTP.

The third surface 130 faces the second light-emitting module 220 and receives the second light. The third surface 130 is inclined with respect to the first and second surfaces 110 and 120 by a predetermined angle. The side surfaces of the light guide plate 100 except for the third surface 130 are substantially perpendicular to each of the first and second surfaces 110 and 120, and a planar area of the first surface 110 is different from that of the second surface 120 since the third surface 130 is an inclined surface. In the illustrated embodiment, for example, the area of the first surface 110 is smaller than that of the second surface 120. The first edge EGP1 is protruded further than the second edge EGP2 in a plan view of the display apparatus 600.

An acute angle ($\theta_s$) (FIG. 4) formed by the first surface 110 and the third surface 130 determines a slope ($\tan \theta_s$) of the third surface 130. The acute angle ($\theta_s$) may be substantially the same as a total reflection angle of the first light. The acute angle ($\theta_s$) may be between about 41° and about 45°. In one exemplary embodiment, for example, when the light guide plate 100 includes polymethyl methacrylate ("PMMA"), the acute angle ($\theta_s$) may be about 42.3°.

The first light-emitting module 210 includes a plurality of first light-emitting diodes 212 which generate light, and a first printed circuit board ("PCB") 214 including the first light-emitting diodes 212 thereon. The first light-emitting diodes 212 are arranged along a first direction of the first PCB 214. The first light-emitting diodes 212 may be arranged in substantially the same direction as the first edge EGP1 extends. In addition, a longitudinal direction of the first PCB 214 is substantially the same as the first direction. On the second surface 120, the light exiting portion OPT longitudinally extends in a second direction substantially perpendicular to the longitudinal extension in first direction of the light incident portion INP. In the first PCB 214, a first PCB surface including the first light-emitting diodes 212 thereon faces the second surface 120. Thus, the first light-emitting diodes 212 are between the second surface 120 and the first PCB 214. The first light is emitted to the light guide plate 100 in a direction substantially perpendicular to the second surface 120.

The second light-emitting module 220 is at a same end portion of the light guide plate 100 as the first light-emitting module 210. The second light-emitting 220 includes a plurality of second light-emitting diodes 222 which generate light, and a second PCB 224 including the second light-emitting diodes 222 thereon. The second light emitted from the second light-emitting diodes 222 has a wavelength different from that of the first light emitted from the first light-emitting diodes 212. The second light-emitting diodes 222 are arranged in a line which is parallel to a line of the first light-emitting diodes 212. In one exemplary embodiment, for example, the second light-emitting diodes 222 are arranged in the first direction, and a longitudinal direction of the second PCB 224 is substantially the same as the first direction. In the second PCB 224, a second PCB surface including the second light-emitting diodes 222 thereon faces the third surface 130, and the second light-emitting diodes 222 are between the third surface 130 and the second PCB 224. The second light is emitted to the light guide plate 100 in a direction substantially perpendicular to the third surface 130.

The receiving container 300 further includes a supporting portion 330 which supports the second PCB 224, so that the second PCB 224 faces the third surface 130. The supporting portion 330 is at a sidewall of the receiving container 300 facing the third surface 130. The supporting portion 330 includes an inclined surface substantially parallel with the third surface 130. The inclined surface of the supporting portion 330 may contact a surface opposite to the second PCB surface including the second light-emitting diodes 222 of the second PCB 224. The second light-emitting module 220 may be stably received in the receiving container 330 by the supporting portion 330.

In an embodiment, the first light-emitting diodes 212 may generate the first light having a wavelength range of an infrared light, and the second light-emitting diodes 212 may generate the second light having a wavelength range of a visible light. Alternatively, the first light-emitting diodes 212 may generate the visible light and the second light-emitting diodes 212 may generate the infrared light. The visible light is used for displaying an image in the touch screen panel PL, and the infrared light is used for sensing an outer touch in the touch screen panel PL.

The mold frame 400 is between the optical sheets 520 and the touch screen panel PL and fixes the reflective sheet 510, the light guide plate 100, the optical sheets 520, the first and second light-emitting modules 210 and 220 in the receiving container 300. In addition, the mold frame 400 may support the touch screen panel PL. The mold frame 400 includes first, second, third and fourth main frame portions 411, 412, 413 and 414 which are connected to each other, a protruding portion 420 and a fixing portion 430.

The first to fourth main frame portions 411, 412, 413 and 414 are connected to each other to form a rectangular shape frame. Each of the first to fourth main frame portions 411, 412, 413 and 414 has a bar shape, e.g., relatively long and evenly shaped. The first to fourth main frame portions 411, 412, 413 and 414 define an opening portion OP partially exposing the optical sheets 520. A light, which exits to the outside of the light guide plate 100 through the light exiting portion OTP, is provided to the touch screen panel PL through the optical sheets 520 and the opening portion OP.

The protruding portion 420 is protruded from the second to fourth main frame portions 412, 413 and 414 and along an outline of the optical sheets 520. Thus, the mold frame 400 presses the outline of the optical sheets 520, and fixes the light guide plate 100 and the reflective sheet 510 under the optical sheets 520 in the receiving container 300.

The fixing portion 430 is connected to the protruding portion 420 and the first main frame portion 411 in a region adjacent to the first light-emitting module 210. The fixing portion 430 has a width taken perpendicular to the respective main frame portion larger than the protruding portion 420. The first light-emitting module 210 is under (e.g., overlaps) the fixing portion 430. In one exemplary embodiment, for example, a surface opposite to the first PCB surface including the first light-emitting diodes 212 of the first PCB 214 directly contacts a surface of the fixing portion 430. In addition, the fixing portion 430 contacts a side portion of the optical sheets 520 adjacent to the first light-emitting module 210. Thus, the fixing portion 430 may stably fix the first light-emitting module 210 on the second surface 120. Furthermore, the fixing portion 430 is on the light incident portion INP so that leaking of the first light and/or the second light in the light incident portion INP may be reduced or effectively prevented.

The first light-emitting module 210 is under the fixing portion 430 of the mold frame 400 in FIGS. 1 to 3. Alternatively, the first light-emitting module 210 may be on an additional fixing member (not shown) not on the mold frame 400. In addition, a shape of the fixing portion 430 of the mold frame 400 is not limited to a structure illustrated in FIGS. 1 to 3.

Further, although not shown in figures, a reflective member including a metal having a high reflection ratio may be between the fixing portion 430 and the first PCB 214. The reflective member may reflect the first light and/or the second light which is leaked in the light incident portion INP to the light guide plate 100 again, so that the light efficiency may be increased. When the first light-emitting module 210 is on the additional fixing member, the reflective member may be between the fixing portion 430 and the first PCB 214.

The touch screen panel PL is on the light-emitting assembly BLU and receives the first light and the second light from the first and second light-emitting modules 210 and 220. The touch screen panel PL is on the protruding portion 420 and the fixing portion 430, and is supported by the mold frame 400.

Hereinafter, providing the first light and the second light emitted from the first and second light-emitting modules 210 and 220 to the light guide plate 100 will be explained in detail, referring to FIGS. 4 and 5.

Figure 4:
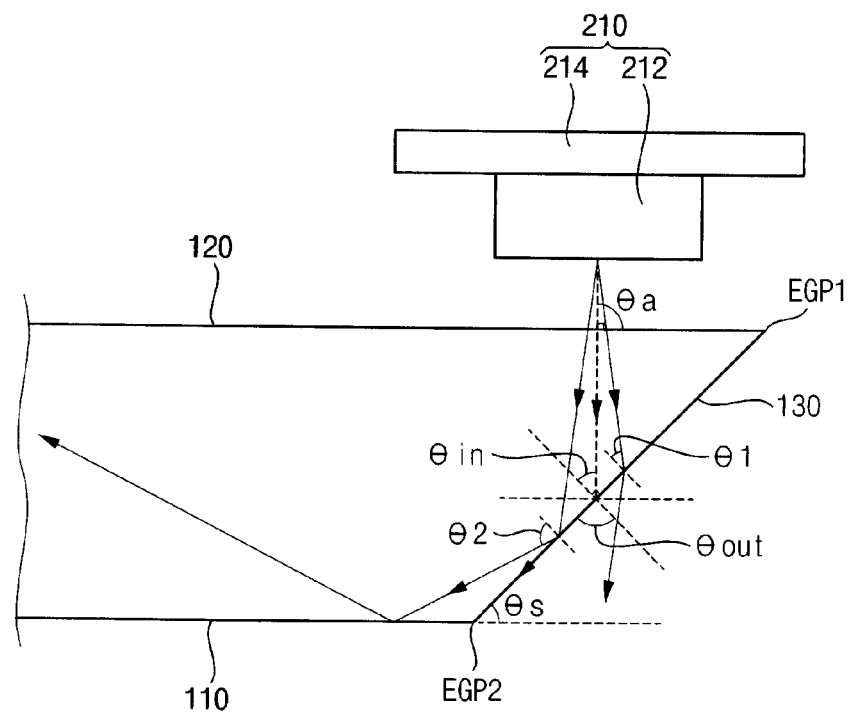
FIG. 4 is a cross-sectional view illustrating the first light-emitting module and the light guide plate in FIG. 1.

FIG. 4 is a cross-sectional view illustrating the first light-emitting module and the light guide plate in FIG. 1.

Referring to FIG. 4, the first light emitted from the first light-emitting diodes 212 is provided to the second surface 120 in a direction substantially perpendicular to the second surface 120. In one exemplary embodiment, for example, an incident angle ($\theta_a$) of the first light incident into the second surface 120 is about 90°. Here, the first light incident into the third surface 130 after passing through the second surface 120 is referred to as "an incident light," and an incident angle ($\theta_{in}$) of the incident light, a refractive index ($n_1$) of the light guide plate 100, a refractive index ($n_2$) of air, and a refractive angle ($\theta_{out}$) of the incident light are expressed by Equation 1.

$$n_1 \sin(\theta_{in}) = n_2 \sin(\theta_{out}) \qquad \text{<Equation 1>}$$

Equation 1 satisfies Snell's law, and the refractive angle ($\theta_{out}$) should be about 90° in order to reflect the incident light on the third surface 130 to be refracted to an inside of the light guide plate 100. The refractive index ($n_2$) of an air is about 1 so that the incident angle ($\theta_{in}$) of the incident light is expressed by Equation 2.

$$\theta_{in} = \sin^{-1}(1/n_1) \qquad \text{<Equation 2>}$$

When the incident angle ($\theta_{in}$) has a value of "$\sin^{-1}(1/n_1)$," the incident light is refracted to the inside of the light guide plate 100. The incident angle ($\theta_{in}$) of the incident light satisfying Equation 2 is substantially the same as the total reflection angle of the first light incident into the third surface 130 through the second surface 120. Alternatively, when the incident angle ($\theta_m$) of the incident light is a first incident angle ($\theta_1$) smaller than the total reflection angle of the first light, the incident light may be refracted to the outside of the light guide plate 100 on the third surface 130. When the incident angle ($\theta_{in}$) of the incident light is a second incident angle ($\theta_2$) larger than the total reflection angle of the first light, the incident light may be refracted to the inside of the light guide plate 100. Thus, the incident angle ($\theta_{in}$) of the incident light is expressed by Equation 3.

$$\sin^{-1}(1/n_1) \leq \theta_{in} < 90° \qquad \text{<Equation 3>}$$

In order to satisfy Equation 3 for the incident angle ($\theta_{in}$) of the incident light, an acute angle ($\theta_s$) formed by the first surface 110 and the third surface 130, when the first light is perpendicularly provided to the second surface 120 from the first light-emitting module 210, is determined to be a value substantially the same as "$\sin^{-1}(1/n_1)$" which is the total reflection angle. In one exemplary embodiment, for example, a refractive index of a material forming the light guide plate 100 is larger than "1" which is the refractive index ($n_2$) of the air, so that the total reflection angle is between about 41° and about 45°.

The first light emitted from the first light-emitting module 210 is partially provided straight to the second surface 120 in a direction substantially perpendicular to the second surface 120. However, the infrared light as the first light is radiated by a predetermined diverging angle so that the acute angle ($\theta_s$) determined by Equation 3 may be adjusted considering to the radiation of the first light.

In one exemplary embodiment, for example, when the light guide plate 100 includes PMMA, a refractive index ($n_1$) of PMMA is about 1.494 so that the incident angle ($\theta_{in}$) of the incident light is about 42.3°. Thus, the light guide plate 100 may be designed having the acute angle ($\theta_s$) of about 42.3°, which means that an angle between the first surface 110 and the third surface 130 as an obtuse angle is about 137.7°.

Figure 5:
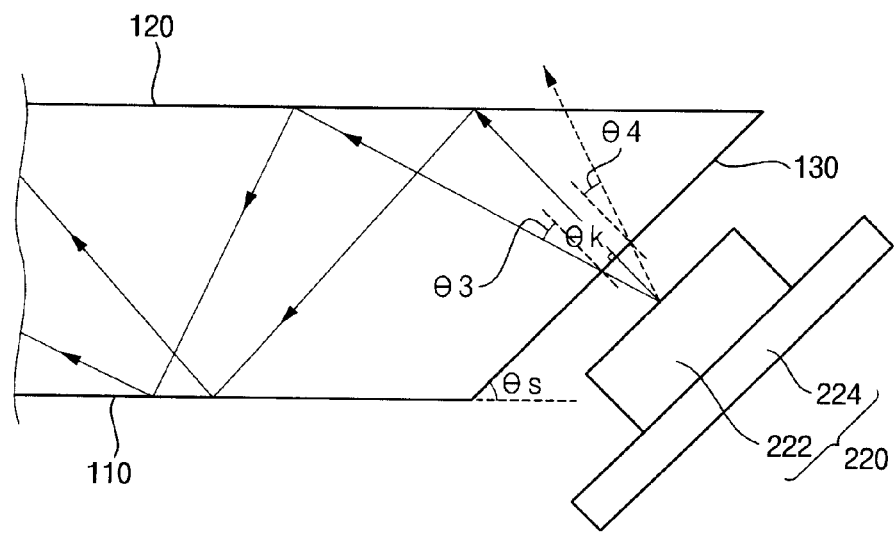
FIG. 5 is a cross-sectional view illustrating the second light-emitting module and the light guide plate in FIG. 1.

FIG. 5 is a cross-sectional view illustrating the second light-emitting module and the light guide plate in FIG. 1.

Referring to FIG. 5, the second light emitted from the second light-emitting diodes 222 is provided to the third surface 130 in a direction substantially perpendicular to the third surface 130. In one exemplary embodiment, for example, an incident angle ($\theta_k$) of the second light on the third surface 130 is about 0°. When the incident angle ($\theta_k$) of the second light satisfies Equation 4, the second light is refracted toward the inside of the light guide plate 100 on the third surface 130.

$$0° \le \theta_k \le 90° \qquad \text{<Equation 4>}$$

The incident angle ($\theta_k$) of the second light when the second light is refracted toward the inside of the light guide plate 100 is defined as an incident angle of a normal direction (hereinafter, referred to as a positive incident angle). In one exemplary embodiment, for example, when the incident angle ($\theta_k$) of the second light is substantially the same as a third incident angle ($\theta_3$) included in the positive incident angle, the second light may be refracted toward the inside of the light guide plate 100. When the incident angle ($\theta_k$) of the second light is a fourth incident angle ($\theta_4$) which is an incident angle of a reverse direction reversed to the positive incident angle (hereinafter, referred to as a negative incident angle), the second light is provided to the outside of the light guide plate 100. When the incident angle ($\theta_k$) of the second light is the negative incident angle, the second light exiting to the outside of the light guide plate 100 is blocked from being provided to the touch screen panel PL by the fixing portion 430 of the mold frame 400. In addition, when the reflective member is on the fixing portion 430, the second light incident into the outside of the light guide plate 100 may be reflected at the reflective member to be incident into the light guide plate 100 again.

Figure 6:
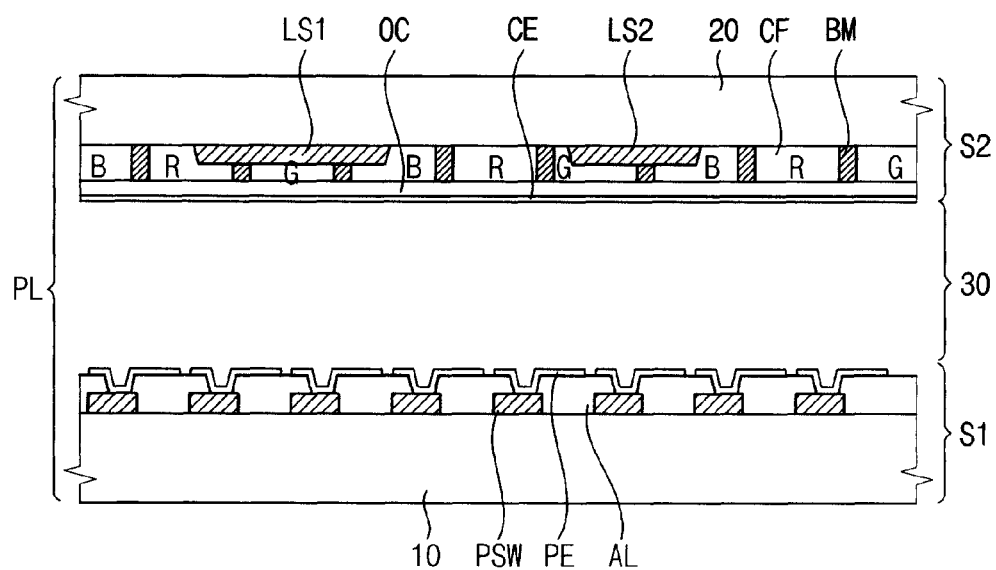
FIG. 6 is a conceptual cross-sectional view illustrating an exemplary embodiment of the touch screen panel in FIG. 1.

FIG. 6 is a conceptual cross-sectional view illustrating an exemplary embodiment of the touch screen panel in FIG. 1.

Referring to FIG. 6, the touch screen panel PL includes a display substrate S1, a touch screen substrate S2 and a liquid crystal layer 30. The touch screen panel PL may sense an outer touch to determine a position of an outer objection contacting on the touch screen panel PL or scan an image of an outer object on the touch screen panel PL.

The display substrate S1 includes a pixel switching element PSW on a first base substrate 10, a pixel electrode PE electrically connected to the pixel switching element PSW, and an array layer AL. In one exemplary embodiment, the pixel electrode PE may define a pixel unit of the display substrate S1.

The touch screen substrate S2 faces the display substrate S1 and is combined with the display substrate S1 so that the liquid crystal layer 30 is interposed between the touch screen substrate S2 and the display substrate S1. The touch screen substrate S2 includes a first photo sensor LS1 and a second photo sensor LS2 on a second base substrate 20. The touch screen substrate S2 may further include a black matrix BM, a color filter CF, an overcoating layer OC and a common electrode CE. The common electrode CE faces the pixel electrode PE to form an electric field in the liquid crystal layer 30. Each of the first and second photo sensors LS1 and LS2 may be in a region corresponding to three pixel units of the display substrate S1. The first photo sensor LS1 is a sensor sensing the infrared light emitted from the first light-emitting module 210, and the second photo sensor LS2 is a sensor sensing the visible light emitted from the second light-emitting module 220. Although not shown in figures, each of the first and second photo sensors LS1 and LS2 may include a sensing element substantially sensing light and a switching element electrically connected to the sensing element.

According to the illustrated exemplary embodiment, both of the first and second light-emitting modules 210 and 220 are at at least one of four edge portions of the light guide plate 100, so that both of the first and second lights are uniformly provided to the touch screen panel PL. In addition, the first and second light-emitting modules 210 and 220 are respectively at the second surface 120 and the third surface 130, so that a thickness of the display apparatus 600 may be minimized and a power consumption of the light-emitting assembly BLU may be minimized.

Figure 7:
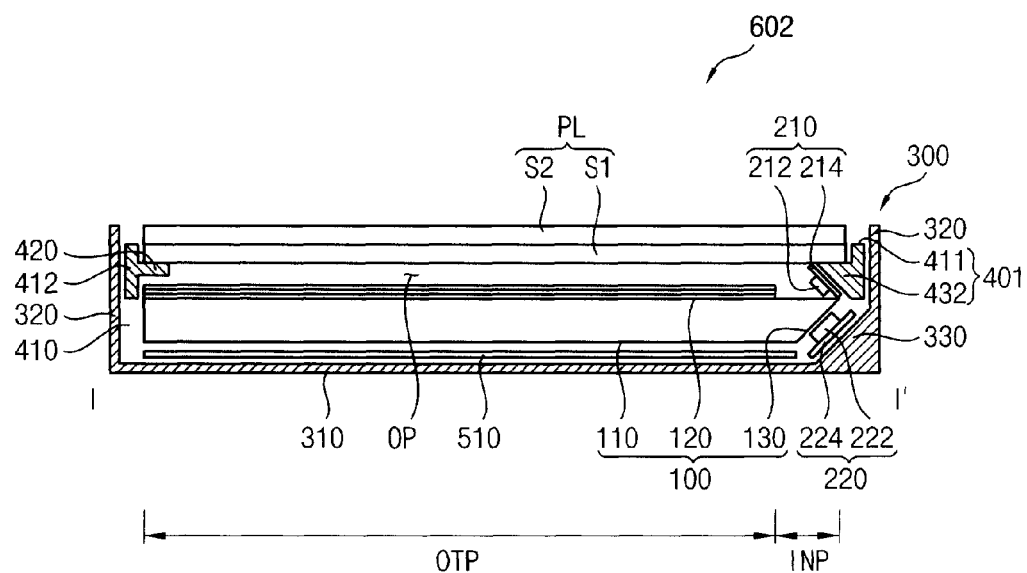
FIG. 7 is a cross-sectional view illustrating another exemplary embodiment of a light-emitting assembly according to the invention.
Figure 8:
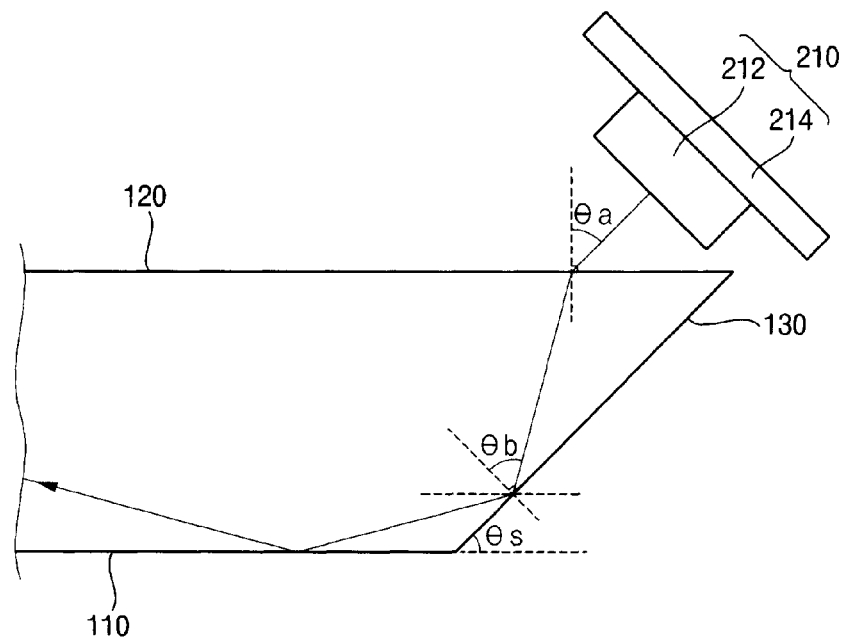
FIG. 8 is an enlarged cross-sectional view illustrating the first light-emitting module and the light guide plate in FIG. 7.

FIG. 7 is a cross-sectional view illustrating another exemplary embodiment of a light-emitting assembly according to the invention. FIG. 8 is an enlarged cross-sectional view illustrating the first light-emitting module and the light guide plate in FIG. 7.

A display apparatus 602 according to the exemplary embodiment shown in FIG. 7 is substantially the same as the display apparatus 600 illustrated referring to FIGS. 1 to 3 except for the light-emitting assembly BLU. In addition, the light-emitting assembly BLU shown in FIG. 7 is substantially the same as the light-emitting assembly BLU illustrated referring to FIGS. 1 to 3 except for a position relationship between the first light-emitting module 210 and the light guide plate 100, and a shape of a mold frame 401. Thus, any repetitive descriptions will be omitted.

Referring to FIGS. 7 and 8, the light-emitting assembly BLU includes the light guide plate 100, the first light-emitting module 210, the second light-emitting module 220, the receiving container 300, the mold frame 401, the reflective sheet 510 and the optical sheets 520.

The light guide plate 100 includes the first surface 110, the second surface 120 and the third surface 130. The first light-emitting module 210 is on the light incident portion INP of the second surface 120. The first PCB 214 of the first light-emitting module 210 is inclined with respect to the second surface 120. The plurality of first light-emitting diodes 212 emitting a first light is on the first PCB 214 and is arranged in a line. In one exemplary embodiment, for example, the first light emitted from the first light-emitting diodes 212 may have a wavelength included in a range of an infrared light, and may include a P-polarized light component more than a non-polarized light component.

Figure 9:
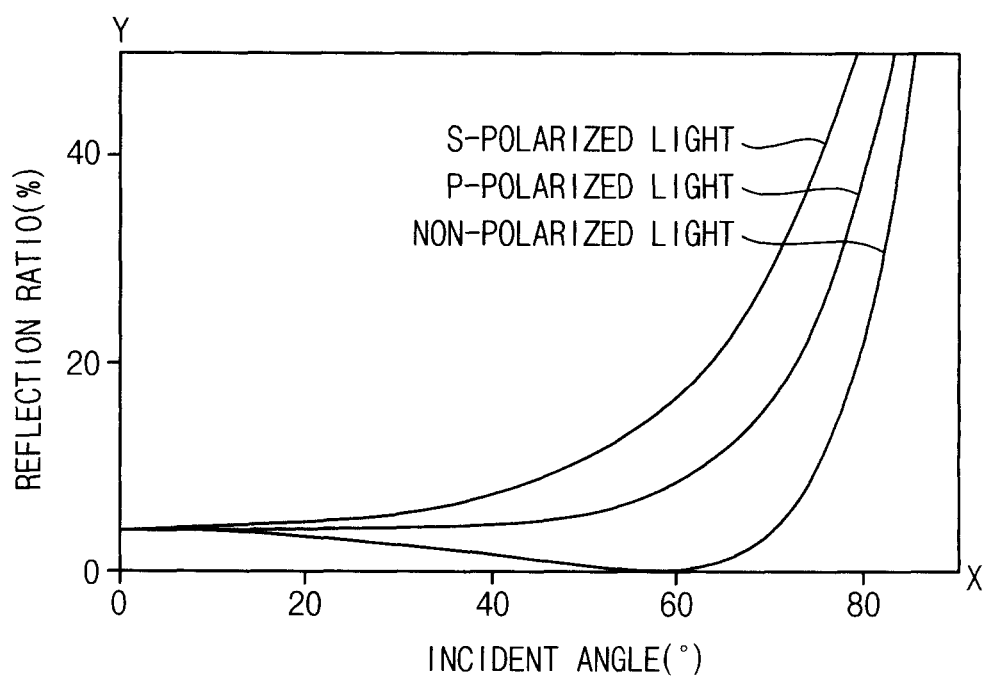
FIG. 9 is a graph illustrating a reflection ratio according to an incident angle of each light component of an infrared light.

FIG. 9 is a graph illustrating a reflection ratio according to an incident angle of each light component of an infrared light.

In FIG. 9, an X axis represents an incident angle ($\theta_a$, unit: degree (°)) of an infrared light and a Y axis represents a reflection ratio (unit:percent (%)) according to the incident angle ($\theta_a$). The incident angle ($\theta_a$) is defined as an angle providing the first light emitted from the first light-emitting module 210 to the second surface 120 with respect to a normal line of the second surface 120.

Referring to FIG. 9, the infrared light includes three types of light components including a P-polarized light component, a non-polarized light component, and an S-polarized light component. The P-polarized light component is a light polarized substantially parallel with the second surface 120 of the infrared light, and the S-polarized light component is a light polarized substantially perpendicular to the second surface 120 of the infrared light.

In each of the P-polarized light component, the non-polarized light component and the S-polarized light, the reflection ratio of the incident angle ($\theta_a$) between about 0° and about 60° is smaller than the reflection ratio of the incident angle ($\theta_a$) between about 70° and about 80°. In one exemplary embodiment, for example, the reflection ratio of incident angles ($\theta_a$) between about 50° and about 60° is about 0% in the P-polarized light component. When the incident angle ($\theta_a$) of the P-polarized light component is between about 50° and about 60°, the reflection ratio on the second surface 120 may be minimized so that most of the P-polarized light component may be provided to the light guide plate 100.

When the reflection ratio of the P-polarized light is about 0%, the incident angle ($\theta_a$) is Brewster's angle ($\theta_B$). When the incident angle ($\theta_a$) of the first light is smaller than Brewster's angle ($\theta_B$), the P-polarized light component may be efficiently provided to the light guide plate 100. Therefore, the first light-emitting module 210 is disposed such that the incident angle ($\theta_a$) of the first light is $0°<\theta_a \leq \theta_B$ to maximize an efficiency of the first light.

In one exemplary embodiment, for example, when an acute angle (00 formed by the first surface 110 and the third surface 130 is determined using a total reflection angle of the first light is about 42.3° and the incident angle ($\theta_a$) of the first light is about 56° substantially same as Brewster's angle ($\theta_B$), the first light passing through the second surface 120 is provided to the third surface 130 in the incident angle ($\theta_b$) of about 76.3° and thus the first light is total-reflected to the inside of the light guide plate 100 and onto the first surface 110.

A position relationship between the light guide plate 100 and the second light-emitting module 220 is substantially the same as that illustrated referring FIG. 5. Thus, any repetitive descriptions will be omitted. In the second PCB 224 of the second light-emitting module 220, the second PCB surface including the second light-emitting diodes 222 thereon is inclined to face the third surface 130.

The mold frame 401 is substantially the same as the mold frame 400 illustrated in FIGS. 1 and 2 except for a fixing portion 432. Thus, any repetitive description will be omitted. Since the first light-emitting module 210 is inclined by a predetermined angle, the fixing portion 432 includes an inclined surface which is inclined toward a slope direction of the first PCB 214. The inclined surface of the fixing portion 432 contacts the surface opposite to the first PCB surface including the first light-emitting diodes 212 thereon. The first light-emitting module 210 may be stably fixed with respect to the second surface 120 by the fixing portion 432. Alternatively, as mentioned above, the first light-emitting module 210 may be on an additional fixing member (not shown) and not on the mold frame 401, and thus the fixing member may include an inclined surface inclined with respect to a slope direction of the first PCB 214. A shape of the fixing portion 432 of the mold frame 401 may not be construed as limited to a structure shown in figures.

According to the illustrated exemplary embodiment, the first and second light-emitting modules 210 and 220 emitting lights different from each other are at at least one of four edge portions of the light guide plate 100, so that both of the first and second lights are uniformly provided to the touch screen panel PL. In the illustrated embodiment, for example, an emitting direction of the first light from the first light-emitting module 210 is inclined with respect to the second surface 120 to maximize an emitting efficiency of the first light. In addition, the first and second light-emitting modules 210 and 220 are at the second surface 120 and the third surface 130, so that a thickness of the display apparatus 602 may be minimized and a power consumption of the light-emitting assembly BLU may be minimized.

Figure 10A:
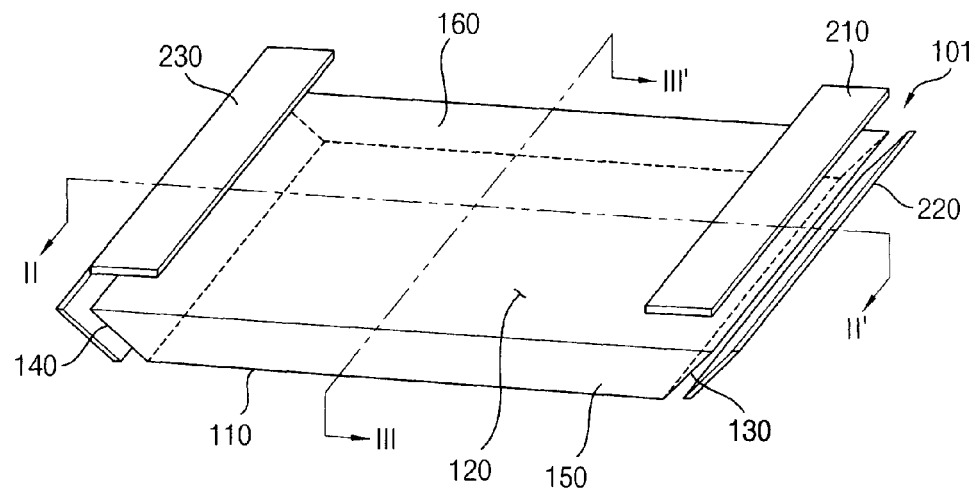
FIG. 10A is a perspective view illustrating another exemplary embodiment of a light guide plate and a light-emitting module of a light-emitting assembly according to the invention.
Figure 10B:
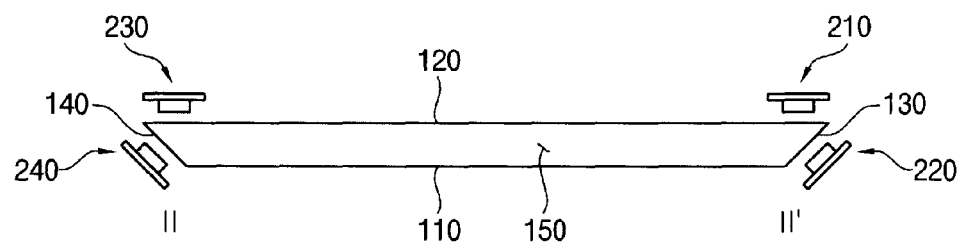
FIG. 10B is a cross-sectional view taken along line II-II' in FIG. 10A.

FIG. 10A is a perspective view illustrating another exemplary embodiment of a light guide plate and a light-emitting module of a light-emitting assembly according to the invention. FIG. 10B is a cross-sectional view taken along line II-II' in FIG. 10A, and FIG. 10C is a cross-sectional view taken along line III-III' in FIG. 10A.

Figure 10C:
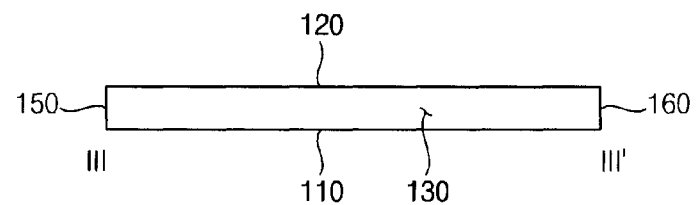
FIG. 10C is a cross-sectional view taken along line III-III' in FIG. 10A.

A light-emitting assembly shown in FIGS. 10A, 10B and 10C is substantially the same as the light-emitting assembly illustrated above referring to FIGS. 1 to 3, except that the light-emitting assembly further includes a third light-emitting module 230 and a fourth light-emitting module 240. Thus, any repetitive descriptions will be omitted.

Referring to FIGS. 10A, 10B and 10C, a light guide plate 101 includes first, second, third, fourth, fifth and sixth surfaces 110, 120, 130, 140, 150 and 160. The light guide plate 101 is substantially the same as the light guide plate 100 illustrated referring to FIGS. 1 to 3 except for the fourth surface 140. Thus, any repetitive descriptions will be omitted.

The first light-emitting module 210 faces the first surface 110, and the second light-emitting module 220 faces the second surface 120. The third light-emitting module 230 faces the second surface 120 corresponding to an edge portion opposite to an edge portion facing the first light-emitting module 210. That is, the first and third light-emitting modules 210 and 230 are respectively on edge portions of the second surface 120 opposite to each other.

The fourth light-emitting module 240 is facing the fourth surface 140. The fourth surface 140 is a surface facing the third surface 130 and has a slope with respect to the first surface 110 similar to the third surface 130. A slope direction of the fourth surface 140 may be substantially perpendicular to a slope direction of the third surface 130. The fifth surface 150 and the sixth surface 160 are side surfaces substantially perpendicular to each of the first and second surfaces 110 and 120.

The third light-emitting module 230 generates light having a wavelength substantially the same as that of the first light-emitting module 210. In addition, the fourth light-emitting module 240 generates light having a wavelength substantially the same as that of the second light-emitting module 220.

Alternatively, the first and fourth light-emitting modules 210 and 240 may emit light having the wavelength substantially same with each other, and the second and third light-emitting modules 220 and 230 may emit light having the wavelength substantially same with each other.

Figure 11A:
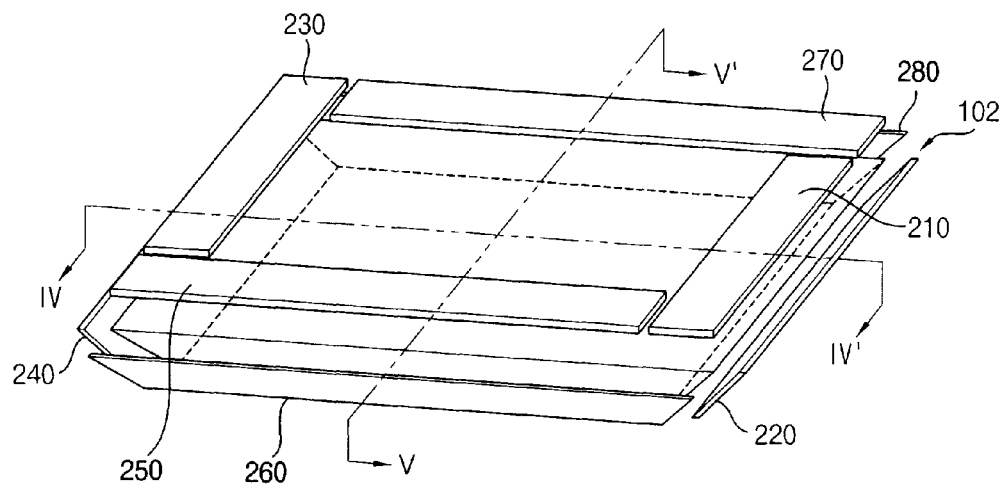
FIG. 11A is a perspective view illustrating still another exemplary embodiment of a light guide plate and a light-emitting module of a light-emitting assembly according to the invention.
Figure 11B:
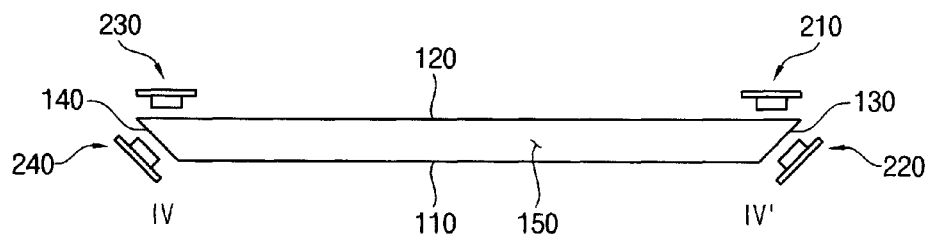
FIG. 11B is a cross-sectional view taken along line IV-IV' in FIG. 11A.

FIG. 11A is a perspective view illustrating still another exemplary embodiment of a light guide plate and a light-emitting module of a light-emitting assembly according to the invention. FIG. 11B is a cross-sectional view taken along line IV-IV' in FIG. 11A, and FIG. 11C is a cross-sectional view taken along line V-V' in FIG. 11A.

Figure 11C:
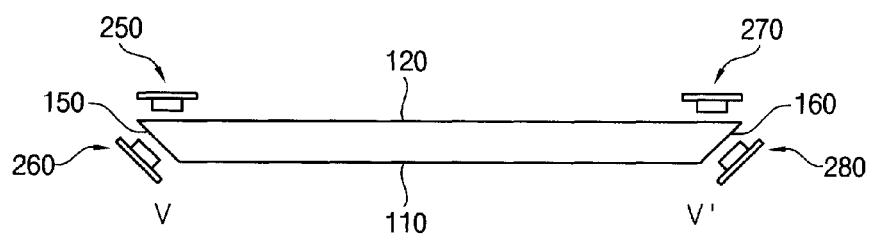
FIG. 11C is a cross-sectional view taken along line V-V' in FIG. 11A.

A light-emitting assembly shown in FIGS. 11A, 11B and 11C is substantially the same as the light-emitting assembly illustrated referring to FIGS. 10A, 10B and 10C except that the light-emitting assembly further includes fifth, sixth, seventh and eighth light-emitting modules 250, 260, 270 and 280 and a shape of a light guide plate 102. Thus, any repetitive descriptions will be omitted.

Referring to FIGS. 11A, 11B and 11C, the light guide plate 102 includes first, second, third, fourth, fifth and sixth surfaces 110, 120, 130, 140, 150 and 160. Each of the third surface 130 and the fourth surface 140 is an inclined surface with respect to the first surface 110 by a predetermined angle, and has an angle inclined in a direction different from each other. In addition, each of the fifth surface 150 and the sixth surface 160 is an inclined surface with respect to the first surface 110 by a predetermined angle, and has an angle inclined in a direction different from each other.

All surfaces except for the first surface 110 of the light guide plate 102 receive light from an outside. In the illustrated embodiment, for example, the first light-emitting module 210 is at a first side of the second surface 120, and a second light-emitting module 220 faces the third surface 130 at the same first side. A third light-emitting module 230 is at a second side opposite to the first side of the second surface 120, and a fourth light-emitting module faces the fourth surface 140 at the same second side. A fifth light-emitting module 250 is at a third side of the second surface 120 different from the first and second sides, and a sixth light-emitting module 260 faces the sixth surface 160 at the same third side. A seventh light-emitting module 270 is at a fourth side opposite to the third side of the second surface 120, and a eighth light-emitting module 280 faces the eighth surface 180 at the same fourth side. When viewing the second surface 120 in the plan view, the light guide plate 102 receives light from each of the first to fourth sides of the second surface 120.

Lights emitted from the first and second light-emitting modules 210 and 220 have wavelengths different from each other, and lights emitted from the third and fourth light-emitting modules 230 and 240 have wavelengths different from each other. In addition, lights emitted from the fifth and sixth light-emitting modules 250 and 260 have wavelengths different from each other, and light emitted from the seventh and eighth light-emitting modules 270 and 280 have wavelengths different from each other.

In one exemplary embodiment, for example, the first, third, fifth and seventh light-emitting modules 210, 230, 250 and 270 may emit a first light having a wavelength substantially same with each other, and the second, fourth, sixth and eighth light-emitting modules 220, 240, 260 and 280 may emit a second light having a wavelength substantially same with each other and different from the first light. Alternatively, the first, fourth, fifth and eighth light-emitting modules 210, 240, 250 and 280 may emit a first light having a wavelength substantially same with each other, and the second, third, sixth and seventh light-emitting modules 220, 230, 260 and 270 may emit a second light having a wavelength substantially same with each other and different from the first light.

Hereinafter, experimental methods for evaluating a light-emitting efficiency and experimental results will be explained referring to FIGS. 12A and 12B.

Evaluation of a Light-Emitting Efficiency

Method of Experiment

A light guide plate, which includes a first surface having a length extending along a first direction of about 300 millimeters (mm), a second surface facing the first surface and having a length extending along the first direction of about 302.19 mm, and a third surface forming an acute angle of about 42.3° with the first surface, was manufactured using PMMA. Then, a photo sensor DET was disposed in a region spaced apart from an edge connecting the first surface with the third surface by about 15 mm.

Experimental Example 1

A light source module LM emitting an infrared light was disposed on the second surface. After the light source module LM was controlled to provide the infrared light substantially perpendicular to the second surface, a light intensity incident into the photo sensor DET was measured.

Experimental Example 2

A light source module LM emitting an infrared light was disposed on the second surface. The light source module LM was controlled such that an incident angle of light incident into the second surface was about 24°, and then the light source module LM was moved in a direction MD toward an outside of the light guide plate by about 0.6 mm. After controlling and moving the light source module LM, a light intensity incident into the photo sensor DET was measured.

Result of Experiments

Figure 12A:
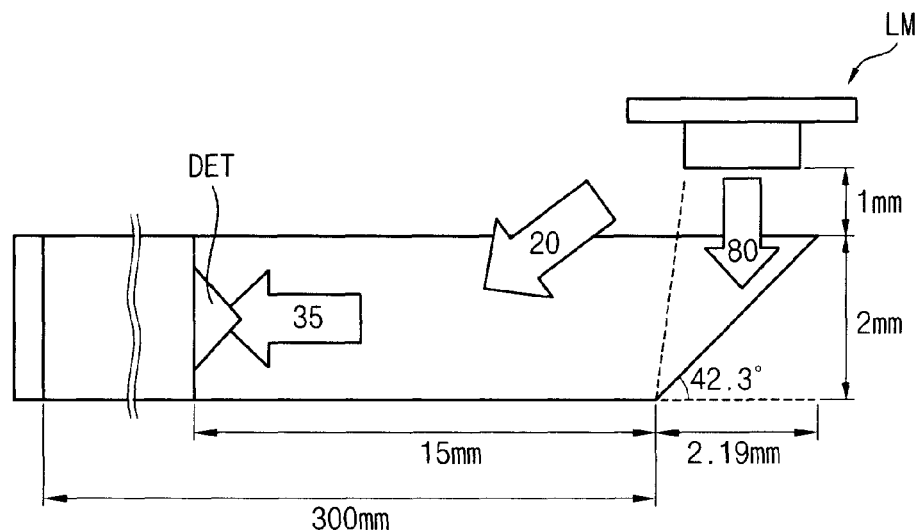
FIGS. 12A and 12B are conceptual cross-sectional views illustrating an efficiency of an incidence light according to a position of a first light-emitting module.
Figure 12B:
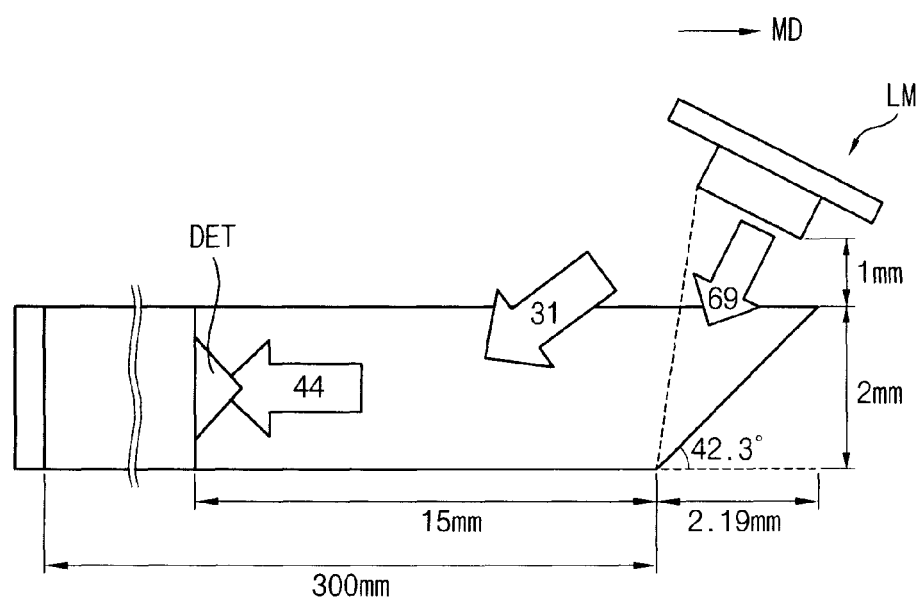

FIGS. 12A and 12B are conceptual cross-sectional views illustrating an efficiency of an incidence light according to a position of a first light-emitting module.

Referring to FIG. 12A, when a total intensity of light incident into the light guide plate from the light-emitting module defines "100," an intensity of light incident into the third surface is about 80 and an intensity of light incident into the first surface is about 20. In addition, an intensity of light sensed by the photo sensor DET is about 35.

Referring to FIG. 12B, based on the total intensity "100" of light incident into the light guide plate from the light-emitting module, an intensity of light incident into the third surface is about 69 and an intensity of light incident into the first surface is about 31. In addition, an intensity of light sensed by the photo sensor DET is about 44.

According to the above results of the experiments, although the light source module LM emits the infrared light on the second surface, the infrared light is provided to the light guide plate using the third surface. In addition, the infrared light is provided to the second surface by an incident angle smaller than Brewster's angle according to Experimental Example 2, so that an intensity of light incident into the light guide plate in Experimental Example 2 is larger than an intensity of light incident into the light guide plate in Experimental Example 1 which is performed by providing the infrared light substantially perpendicular to the second surface. Based on the above descriptions, a P-polarized light component of the infrared light incident into the light guide plate in Experimental Example 2 may be larger than a P-polarized light component of the infrared light incident into the light guide plate in Experimental Example 1.

According to the invention, a thickness of a display apparatus using two different types of light-emitting modules providing light to a touch screen panel may be decreased, and a power consumption of a light-emitting assembly may be decreased to reduce a manufacturing cost.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A light-emitting assembly comprising:
   a light guide plate including:
   a first surface,
   a second surface which faces the first surface and includes a light incident portion and a light exiting portion, and
   a third surface which connects the first surface with the second surface and is inclined toward the first surface;

a first light-emitting module which is on the light incident portion of the second surface and emits a first light to the light incident portion of the second surface; and a second light-emitting module which faces the third surface and emits a second light having a wavelength different from a wavelength of the first light, to the third surface.

2. The light-emitting assembly of claim 1, wherein an area of the first surface is smaller than that of the second surface.

3. The light-emitting assembly of claim 2,
wherein the light incident portion comprises a projective plane of the third surface orthogonal to the second surface, and
wherein the first light and the second light incident into the light guide plate exit through the light exiting portion of the second surface.

4. The light-emitting assembly of claim 1, wherein an acute angle ($\theta_s$) formed by the first surface and the third surface is substantially the same as a total reflection angle of the first light which passes through the light incident portion of the first surface and is incident on the third surface.

5. The light-emitting assembly of claim 4, wherein the acute angle ($\theta_s$) is between about 41° and about 45°.

6. The light-emitting assembly of claim 5, wherein the light guide plate comprises polymethyl methacrylate, and the acute angle ($\theta_s$) is about 42.3°.

7. The light-emitting assembly of claim 1, wherein the first light which passes through the light incident portion of the second surface is reflected by the third surface, is guided into the light guide plate and exits through the light exiting portion of the second surface.

8. The light-emitting assembly of claim 1, wherein when "$\theta_B$" refers to the Brewster's angle of the first light incident into the light incident portion, an incident angle ($\theta_a$) of the first light incident into the light incident portion is $0° \leq \theta_a \leq \theta_B$.

9. The light-emitting assembly of claim 1, wherein the second light is incident to the light guide plate in a direction perpendicular to the third surface.

10. The light-emitting assembly of claim 9, wherein the second light which passes through the third surface is reflected by the second surface, is guided into the light guide plate and exits through the light exiting portion of the second surface.

11. The light-emitting assembly of claim 1, wherein the first light-emitting module comprises:
a plurality of first light-emitting diodes which generate the first light; and
a first printed circuit board comprising a first printed circuit board surface including the first light-emitting diodes thereon in a line, the first printed circuit board surface facing the light incident portion of the second surface.

12. The light-emitting assembly of claim 11, wherein the second light-emitting module comprises:
a plurality of second light-emitting diodes which generate the second light; and
a second printed circuit board comprising a second printed circuit board surface including the second light-emitting diodes thereon in substantially the same direction as the line of the first light-emitting diodes, the second printed circuit board surface facing the third surface.

13. The light-emitting assembly of claim 1, wherein the first light is an infrared light and the second light is a visible light.

14. A display apparatus comprising:
a light-emitting assembly including:
a light guide plate including a first surface, a second surface which faces the first surface and includes a light incident portion and a light exiting portion, and a third surface which connects the first surface with the second surface and is inclined toward the first surface;
a first light-emitting module which is on the light incident portion of the second surface and emits a first light to the light incident portion; and
a second light-emitting module which faces the third surface and emits a second light having a wavelength different from a wavelength of the first light, to the third surface; and
a touch screen panel which receives the first light and the second light, and displays an image and senses an outer touch using the first light and the second light.

15. The display apparatus of claim 14, wherein an acute angle ($\theta_s$) formed by the first surface and the third surface is substantially the same as a total reflection angle of the first light which passes through the light incident portion of the first surface and is incident on the third surface.

16. The display apparatus of claim 14, wherein when "$\theta_B$" refers to the Brewster's angle of the first light incident into the light incident portion, an incident angle ($\theta_a$) of the first light incident into the light incident portion is $0° \leq \theta_a \leq \theta_B$.

17. The display apparatus of claim 14, wherein the second light is incident to the light guide plate in a direction perpendicular to the third surface.

18. The display apparatus of claim 14, further comprising:
a mold frame which supports the touch screen panel, and includes a fixing portion which fixes the first light-emitting module on the second surface of the light guide plate, and
a receiving container which receives the light-emitting assembly, the mold frame and the touch screen panel.

19. The display apparatus of claim 18, wherein the receiving container comprises a supporting portion which faces the third surface of the light guide plate and supports the second light-emitting module.

20. The display apparatus of claim 14, wherein the touch screen panel comprises:
a touch screen substrate including a first sensing part which senses the first light, and a second sensing part which senses the second light; and
a display substrate which faces the touch screen substrate and includes a pixel electrode, and a switching element in electrical connection with the pixel electrode.

* * * * *